United States Patent [19]

McDaniel et al.

[11] 4,398,004

[45] Aug. 9, 1983

[54] OLEFIN POLYMERIZATION WITH PHOSPHATED SILICA-CHROMIUM CATALYST WITH BORON-CONTAINING COCATALYST

[75] Inventors: Max P. McDaniel; Marvin M. Johnson, both of Bartlesville, Okla.

[73] Assignee: Phillips Petroleum Company, Bartlesville, Okla.

[21] Appl. No.: 424,793

[22] Filed: Sep. 27, 1982

Related U.S. Application Data

[62] Division of Ser. No. 221,754, Dec. 31, 1980, Pat. No. 4,364,840.

[51] Int. Cl.$^3$ .............................. C08F 4/02; C08F 4/62
[52] U.S. Cl. ..................................... 526/98; 252/428; 252/430; 526/106; 526/348.2; 526/348.5; 526/348.6; 526/352
[58] Field of Search .................................. 526/106, 98

[56] References Cited

U.S. PATENT DOCUMENTS

| | | | |
|---|---|---|---|
| 2,945,015 | 7/1960 | Detter | 526/106 |
| 3,794,628 | 2/1974 | Bower | 252/431 R |
| 3,806,500 | 4/1974 | Karol | 526/107 |
| 3,875,132 | 4/1975 | Kruse | 252/431 R |

*Primary Examiner*—Stanford M. Levin

[57] ABSTRACT

A catalyst system suitable for olefin polymerization comprising a catalyst component made up of chromium on a phosphated silica-containing base and a boron-containing cocatalyst. The resulting catalyst is particularly sensitive to the effects of hydrogen as a molecular weight control agent, thus allowing the production of polymers of having a melt flow varying over a wide spectrum utilizing the same catalyst.

10 Claims, No Drawings

OLEFIN POLYMERIZATION WITH PHOSPHATED SILICA-CHROMIUM CATALYST WITH BORON-CONTAINING COCATALYST

CROSS REFERENCE TO RELATED APPLICATION

This is a divisional of copending application Ser. No. 221,754, filed Dec. 31, 1980, U.S. Pat. No. 4,364,840.

BACKGROUND OF THE INVENTION

This invention relates to phosphated chromium containing olefin polymerization catalysts.

Supported chromium oxide catalysts can be used to prepare olefin polymers in a hydrocarbon solution to give a product having excellent characteristics from many standpoints. It is known from Detter, U.S. Pat. No. 2,945,015 issued July 12, 1960 that the activity of such catalyst system can be improved slightly by treating the support with phosphoric acid. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However certain control operations which are easily carried out in the solution process are considerably more difficult in the particle-form process. For instance, in the solution process, control of the molecular weight can be effected by changing the temperature with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle-form process. Also, it is frequently desired to have a polymer with a broader molecular weight distribution than is normally obtained in the slurry or particle-form process.

SUMMARY OF THE INVENTION

It is an object of this invention to provide a catalyst capable of giving both high melt flow and broad molecular weight distribution polymer;

It is a further object of this invention to provide a catalyst which inherently produces high molecular weight polymer and which is especially sensitive to molecular weight control agents so that a single catalyst can produce a complete spectrum of polymers so far as melt flow is concerned;

It is a further object of this invention to provide a catalyst suitable for use in slurry polymerization systems; and It is yet a further object of this invention to provide a catalyst capable of giving polymer suitable for blow molding and other applications requiring moderate to relatively high melt flow and at least fairly broad molecular weight distribution.

In accordance with this invention, a silica-containing base for a chromium-containing catalyst is phosphated and the resulting catalyst used in conjunction with a boron-containing cocatalyst.

DESCRIPTION OF THE PREFERRED EMBODIMENTS

The support for the catalyst of this invention is a silica-containing material generally composed of 80 to 100 weight percent silica, the remainder, if any, being selected from alumina, boria, magnesia, thoria, titania, zirconia, or mixtures thereof. For instance, the silica-containing material can consist essentially of silica and no more than 0.2 weight percent of alumina or other metal oxide. Other ingredients which do not adversely affect the catalyst or which are present to produce some unrelated result can also be present. The support can be a large pore material prepared as described in U.S. Pat. Nos. 3,887,494 which issued June 3, 1975 to Dietz covering the preparation of silica-titania cogels or U.S. 3,900,457 which issued Aug. 19, 1975 to Witt covering the preparation of a synthetic silica, the disclosures of which are hereby incorporated by reference. These types of silicas are known in the art to inherently give higher melt flow polymer. However, one of the advantages of this invention is that the silica base does not have to be a large pore silica. Thus, in accordance with the preferred embodiments of this invention, less expensive silicas made by simple tray drying, oven drying or spray drying can be used. These silicas are easier and less expensive to produce and are inherently more durable. The phosphate treatment can be carried out either before or after drying, i.e., can be carried out on either the hydrogel or the xerogel. The catalyst contains chromium in an amount generally within the range of about 0.001 to 10, preferably 0.1 to 5, more preferably about 1 weight percent based on the weight of the dried silica base (xerogel). The chromium compound can be incorporated as known in the art. For instance, a hydrocarbon solution of a material such as tertiary-butyl chromate can be used to impregnate the xerogel or an aqueous solution of a chromium compound such as chromium trioxide or chromium acetate can be added to the hydrogel before drying, or chromium compound can be coprecipitated along with the silica. In general, it is preferred to add the phosphorus component before the chromium component. Most preferably, the phosphated base is heated prior to addition of the chromium. Thus, in this preferred embodiment, the base is heated twice, once after the phosphorus is added, then the chromium is added and it is heated again to activate the catalyst for polymerization.

The treatment to produce the phosphated silica support is preferably carried out simply by forming a slurry of the support and the phosphoric acid by either adding the acid to the support or the support to the acid. Alternatively, a nonmetallic phosphate can be utilized. The preferred phosphate is a monoammonium phosphate although diammonium phosphate or metal phosphates or any phosphorus compound convertible to a phosphate on calcination can be utilized as the phosphating agent. Any reasonable temperature and atmosphere can be utilized for the incorporation of the phosphorus into the silica with room temperature in air being entirely satisfactory. Alternatively, a phosphorus compound such as $POCl_3$ (phosphoryl chloride) or $PCl_3$ (phosphorus trichloride) can be vaporized and the vapor contacted with the silica (in the xerogel state). These materials will react with surface OH groups and give off HCl. This vapor treatment can be carried out at the vaporization temperature of the phosphorus compound up to about 400° C. Then the treated silica is heated prior to adding the chromium if the chromium is yet to be added which is the preferred sequence.

The term "phosphated" is meant to describe the silica treated with a phosphorus compound as described herein and not necessarily to mean that phosphate groups are attached to the silica. Probably any reaction with the silica takes place on activation when phosphoric acid or a phosphate is the treating agent.

The phosphorus component is added in an amount to give 0.1 to 20, preferably 1 to 10 mole percent of the phosphorus compound based on the moles of silica. Most preferably about 1 to 5 mole percent is used which would be about 1 to 5 atom. of phosphorus per atom of chromium particularly when the preferred 1 weight percent chromium based on the weight of the silica-containing support is used. Generally, the ratio of atoms of phosphorus per atom of chromium will be in the range of 0.1 to 20, preferably 1 to 10. Based on surface area, the phosphorus compound is preferably present in an amount sufficient to give about 0.005 to 1, preferably about 0.01 to 0.5 mg P/m$^2$ of silica surface as measured by BET nitrogen sorption. After incorporation of both the chromium and the phosphorus compounds, the catalyst is activated. This can be done under conditions known in the art. However, one of the advantages of this invention is that it allows the use of relatively low activation temperatures. Generally temperatures of 300°–800°, preferably 400°–600°, mosst preferably about 500° C. are used. The activating ambient can be any oxidizing atmosphere although for the sake of simplicity and economy, an oxygen-containing ambient such as air is preferred. Times of 5 minutes to 24 hours, preferably ½ to 10 hours, are satisfactory.

When the base is phosphated before the chromium is added, the subsequent heat treatment preferably employed can be carried out in either an inert or oxidizing ambient such as air for a time of 1 minute to 10 hours, preferably 2 to 60 minutes. The temperature can be 100°–800°, preferably 200°–600° C. Thereafter the catalyst is cooled, for instance to about room temperature and the chromium compound added.

The catalysts of this invention are used in conjunction with an organic boron-containing cocatalyst. The use of cocatalysts, such as aluminum alkoxides, aluminum alkyls, boron alkyls, and other metal compounds is well known in the art. These materials are used to enhance activity with the realization that a sacrifice in melt flow must be accepted. In accordance with this invention, certain of these cocatalysts, namely those containing boron have the opposite effect, that is, they increase the melt flow. The most preferred boron compounds are trihydrocarbyl boron compounds, particularly tri-n-butylborane and triethylborane. Other suitable boron compounds include trialkyl boron compounds broadly, particularly those having alkyl groups of 1 to 12 carbon atoms, preferably 2 to 5 carbon atoms, triaryl boron compounds such as triphenylborane, boron alkoxides such as $B(C_2H_5)_2OC_2H_5$ and halogenated alkyl boron compounds such as $BC_2H_5Cl_2$.

The cocatalyst is generally used in an amount within the range of about 0.5 to 20, preferably 2 to 10 parts per million based on the solvent in systems employing a solvent and based on total reactor contents in systems not employing a solvent. Based on the chromium in the catalyst, they are generally used in an amount so as to give from 0.1 to 3, preferably 0.3 to 2 times as much boron by weight as chromium by weight. Based on atoms of boron per atom of chromium, the amount of cocatalyst used will give 0.5 to 10, preferably 2 to 5 atoms of boron per atom of chromium.

The cocatalyst can be either premixed with the catalyst or introduced into the reactor as a separate stream, the latter being the preferred procedure.

Of course, the final catalyst can be used with, or contain other ingredients which do not adversely affect its performance, as for example other cocatalysts, antistatic aids in the polymerization zone and other conventional ingredients.

The catalyst of this invention can be used to polymerize at least one mono-1-olefin containing 2 to 8 carbon atoms per molecule, preferably ethylene, propylene, 1-butene, 1-pentene, 1-hexene and 1-octene. The invention is of particular applicability in producing ethylene homopolymers and copolymers from mixtures of ethylene and 0.5 to 20 mole percent one or more comonomers selected from 1-olefins containing 3 to 8 carbon atoms per molecule. Exemplary comonomers include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably 97 to 99.6 weight percent polymerized ethylene units. Propylene, 1-butene, 1-pentene, 1-hexene and 1-octene are especially preferred comonomers for use with ethylene.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,063 which issued Nov. 30, 1971 to Witt, the disclosure of which is hereby incorporated by reference.

The catalyst of this invention is particularly suitable for use in slurry polymerizations. The slurry process is generally carried out in an inert diluent (medium) such as paraffin, cycloparaffin or aromatic hydrocarbon. For predominantly ethylene polymers, a temperature of about 66°–110° C. is employed. Pressures in the particle form process can vary from about 110 to about 700 psia (0.76–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

When hydrogen is used in the prior art, it is generally used at pressures up to 120 psia (0.8 MPa), preferably within the range of 20 to 70 psia (0.01 to 0.48 MPa). Similar amounts can be used in accordance with this invention although slightly smaller amounts are sometimes preferred because of the sensitivity of this catalyst system to the effects of hydrogen.

The presence of comonomer has a tendency to increase melt flow slightly more than would be expected. Hence the use of only a small amount of comonomer, say 0.001 to 0.3, preferably 0.01 to 0.1 mole percent in the feed can be used to give a polymer which is essentially a homopolymer but which has increased melt flow.

EXAMPLE I

A base catalyst containing a chromium component in an amount sufficient to give 1 weight percent chromium calculated on a dry basis of support plus chromium was formed by spray drying a silica hydrogel having about 0.1 weight percent alumina containing an aqueous solution of chromium acetate. Essentially identical catalysts can be formed by impregnating 952 grade silica commercially available from Davison Chemical Company with an aqueous solution of chromium acetate and drying at about 200°–400° F. (129°–204° C.) in air. In Run 1 set out hereinbelow, this xerogel was impregnated with 5 mole percent $H_3PO_4$ based on the moles of silica and dried at 110° C., then activated at 500° C. in air. Control Runs A and B were treated identically except that no phosphorus was added. These three catalysts were used to polymerize ethylene at 205° F. (96° C.), 565 psia (3.9 MPa) pressure (including ethylene and $H_2$, if used) with 1 cc of a 0.5 weight percent (based on solvent weight) of triethylborane (4 ppm by weight boron based on the weight of isobutane diluent). The results were as follows:

| Run | Additive | $H_2$ | Grams Wt. Cat. | Productivity g Polymer/g Cat. | Run Time | HLMI | Polymer Yield |
| --- | --- | --- | --- | --- | --- | --- | --- |
| Invention 1 | $H_3PO_4$ | None | 0.3020 | 1105 | 70 min. | 2.8 | 334 |
| Control A | None | None | 0.1440 | 2205 | 90 min. | 0.2 | 320 |
| Control B | None | 50 psia | 0.1735 | 705 | 90 min. | 1.8 | 122 |
| Invention 2 | $H_3PO_4$ | 50 psia | 0.2540 | 1390 | 70 min. | 21.8 | 353 |

The effect of the boron-containing cocatalyst increasing the melt flow as opposed to the expected decrease is shown in a comparison of Invention Run 1 with Control A. Indeed, the invention run has a higher melt flow even than Control Run B which was made utilizing hydrogen, a known agent for increasing melt flow. Invention Run 2 shows the extraordinary sensitivity of the catalysts of this invention to the use of a conventional melt flow increasing agent such as hydrogen.

High Load Melt INdex (HLMI) is calculated as described by ASTM D 1238-65T, Condition F.

This example demonstrates phosphating a xerogel support.

EXAMPLE II

Three additional catalysts were prepared as follows:

Catalyst A—95.2 gm wet silica hydrogel, 21 percent solids was slurried in $H_2O$. To this was added 3.8 mL $CrO_3$ solution (0.052 gm Cr/mL) which gave 1 percent Cr by weight on the final dry silica. The hydrogel was converted to a xerogel by evaporating the water on a hot plate.

Catalyst B—Run A was repeated but also there was added 1.25 mL 85 percent $H_3PO_4$ to the hydrogel to provide 5 mole percent phosphorus based on the moles of silica.

Catalyst C—Run A was repeated but also there was added 2.6 mL $H_3PO_4$ to provide 10 mole percent phosphorus based on the moles of silica.

Polymerization: At 205° F. (96° C.), 565 psia (3.9 MPa), 8 ppm triethylborane (TEB) based on the isobutane diluent.

| Catalyst: | A | B | C | A | B | B |
| --- | --- | --- | --- | --- | --- | --- |
| Run No. | 1 | 2 | 3 | 4 | 5 | 6 |
| $H_2$, psia | 50 | 50 | 50 | 50 | 50 | 50 |
| Run Time (min) | 60 | 45 | 60 | 50 | 30 | 60 |
| Productivity (g polymer/g cat.) | 500 | 800 | 0 | 2945 | 129 | 0 |
| Weight Polymer, g | 138 | 373 | 0 | 327 | 15 | 0 |
| Wt. Cat., g | 0.2760 | 0.4680 | 0.2905 | 0.1110 | 0.1165 | 0.3550 |
| Act. Temp. | 300° C. | 300 | 300 | 500 | 500 | 700 |
| MI | .018 | .124 | — | .069 | — | — |
| HLMI/MI | 644 | 190 | — | — | — | — |
| % $Cr^{+6}$* | .62% | <.2 | 0% | .75 | 0 | 0 |

*In the activated catalyst as measured by titration with $iron^{++}$.

Melt index is calculated as described in ASTM D 1238-65T, Condition E and High Load Melt Index (HLMI) as described in ASTM D 1238-65I, Condition F.

These data show that at higher activation temperatures and higher phosphorus levels the chromium can be deactivated. Thus, it is preferred to heat the phosphated catalyst prior to adding the chromium as described hereinbefore so as to avoid dead or essentially dead catalysts as obtained in runs 3, 5 and 6.

This example demonstrates phosphating a hydrogel support.

EXAMPLE III

Silica (50 mL Davison 952) was dried at 200° C. for 1 hour in argon and held at that temperature and 11 cc of $POCl_3$ was evaporated into the argon stream so that it flowed up into the bed over a period of about 1 hour. The thus phosphate treated silica was calcined in air at 400° C. for 2 hours and then titrated with base titration and found to contain 1.100 millimoles of acid per gram (to the Bromo Cresol Green end point). It was also checked for chloride with $AgNO_3$ and found to have 0.415 millimoles chloride per gram. This was done by adding a sample of the silica to water which hydrolyzes the chloride. It was heated back to 200° C. in air and 2 ml of H₂O vaporized into it. It was checked again for chloride with the result that no chloride was found. It was again titrated with a base and found to have 0.637 millimoles acid/gm which the phosphate would account for. Then it was reheated to 500° C. in argon for 1 hour to dry and then checked again for acid which showed 0.588 millimoles/gram. Thus most of the phosphate was chemically attached to silica since it was heated to above the sublimation point of $P_2O_5$ with little change in the amount of acid found. A slurry of the silica was formed in a pentane solution of dicumene chromium, the solvent evaporated and the catalyst was activated in air at 300° C. It was orange in color but inactive for polymerization.

A remaining portion was reactivated at 500° C. whereupon the catalyst turned grey but was active as shown hereinbelow in polymerization runs at 205° F. (96° C.).

| Run | Activation Temp. °C. | Cocatalyst 8 ppm | Hydrogen | Run Time Min. | Yield, g/g | Productivity g/g/hr | HLMI | MI | HLMI/MI |
|---|---|---|---|---|---|---|---|---|---|
| 1 | 500 | TEB | No | 40 | 3045 | 4568 | 0.5 | 0 | — |
| 2 | 500 | TEB | 50 psi | 50 | 3230 | 3876 | 9.75 | 0.03 | 325 |
| 3 | 500 | TEA | No | 70 | 2220 | 1903 | 0.18 | 0 | — |

Runs 1-2 show that the silica can be phosphated with a vapor of a phosphorus compound and that the chromium can be put on after the phosphate treatment. While the results are not outstanding, a control (no phosphate treatment) activated at 500° C. with no hydrogen has a HLMI of about 0.15 instead of the 0.5 obtained in run 1. Similarly, a control with hydrogen has a MI of 0 and an HLMI of about 1.8 compared with the 0.03 MI and 9.75 HLMI of run 2.

Run 3 shows that the boron-containing cocatalyst is essential since an aluminum-containing cocatalyst triethylaluminum (TEA) was not effective.

EXAMPLE IV

Ethylene was polymerized with about 0.8 weight percent 1-hexene comonomer in the feed based on the weight of the ethylene plus diluent using a chromium on phosphated silica catalyst. This increased the melt flow from 0.18 HLMI for an identical run without the 1-hexene to 146 HLMI for the run with the 1-hexene. This is a greater increase in melt flow than is obtained with the presence of a comonomer in ethylene polymerization using a commercial chromium on silica catalyst.

While this invention has been described in detail for the purpose of illustration it is not to be construed as limited thereby but is intended to cover all changes and modifications within the spirit and scope thereof.

I claim:

1. A polymerization process comprising:
contacting at least one mono-1-olefin having 2 to 8 carbon atoms with a catalyst system comprising
   (a) a catalyst comprising a chromium oxide on a phosphated silica-containing base wherein there is present 0.01 to 0.5 mg $P/m^2$ of silica surface as measured by BET nitrogen sorption;
   (b) a cocatalyst selected from trihydrocarbyl boron compounds, boron alkoxides and halogenated alkyl boron compounds; and
recovering a polymer.

2. A method according to claim 1 wherein said olefin selected from ethylene, propylene, 1-butene, 1-pentene, 1-hexene and 1-octene.

3. A method according to claim 2 wherein said olefin comprises ethylene.

4. A process according to claim 1 wherein said cocatalyst is added to a reaction zone containing said mono-1-olefin as a separate stream from the catalyst.

5. A process according to claim 1 wherein said polymer is an ethylene homopolymer or a copolymer having 97 to 99.6 weight percent polymerized ethylene units.

6. A polymerization process comprising:
contacting at least one mono-1-olefin having 2 to 8 carbon atoms per molecule with a catalyst system prepared by a process comprising
   (a) treating a silica-containing support with a phosphating agent and activating said thus treated catalyst in an oxidizing atmosphere at an elevated temperature, said support either having a chromium compound coprecipitated therewith or having a chromium compound added thereto prior to said activating in said oxidizing atmosphere, said phosphating agent being utilized in an amount sufficient to give 0.1 to 20 mole percent of said phosphating agent based on the moles of silica in said silica-containing support;
   (b) combining a cocatalyst selected from trihydrocarbyl boron compounds, boron alkoxides and halogenated alkyl boron compounds with said catalyst; and
recovering a polymer.

7. A method according to claim 6 wherein said olefin is selected from ethylene, propylene, 1-butene, 1-pentene, 1-hexene and 1-octene.

8. A method according to claim 7 wherein said olefin comprises ethylene.

9. A process according to claim 6 wherein said cocatalyst is added to a reaction zone containing said mono-1-olefin as a separate stream from the catalyst.

10. A process according to claim 6 wherein said polymer is an ethylene homopolymer or a copolymer having 97 to 99.6 weight percent polymerized ethylene units.

* * * * *